(12) United States Patent
Yokota

(10) Patent No.: US 8,654,196 B2
(45) Date of Patent: Feb. 18, 2014

(54) IMAGE PICKUP APPARATUS AND RANGEFINDER, WITH ALTERING BASELINE LENGTHS FOR PARALLAX COMPUTATION OBTAINED BY COMBINING ANY TWO OF A PLURALITY OF CAMERAS

(75) Inventor: Soichiro Yokota, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 350 days.

(21) Appl. No.: 13/025,890

(22) Filed: Feb. 11, 2011

(65) Prior Publication Data

US 2011/0211068 A1 Sep. 1, 2011

(30) Foreign Application Priority Data

Mar. 1, 2010 (JP) ................................. 2010-044168
Dec. 13, 2010 (JP) ................................. 2010-277395

(51) Int. Cl.
*H04N 7/18* (2006.01)
(52) U.S. Cl.
USPC ........................................................ 348/139
(58) Field of Classification Search
CPC .................................................... H04N 7/181
USPC ........ 348/139; 356/3.13, 3.14, 12, 13, 14, 15; 235/414, 415, 416
See application file for complete search history.

(56) References Cited

U.S. PATENT DOCUMENTS

| | | | | |
|---|---|---|---|---|
| 6,009,189 A | * | 12/1999 | Schaack | 382/154 |
| 7,336,296 B2 | * | 2/2008 | Brown et al. | 348/139 |
| 7,855,752 B2 | * | 12/2010 | Baker et al. | 348/588 |
| 8,102,516 B2 | * | 1/2012 | Imamura | 356/6 |
| 2006/0055811 A1 | * | 3/2006 | Frtiz et al. | 348/340 |
| 2008/0117316 A1 | | 5/2008 | Orimoto | |
| 2010/0053414 A1 | | 3/2010 | Tamaki et al. | |
| 2011/0057273 A1 | * | 3/2011 | O'Donnell et al. | 257/414 |

FOREIGN PATENT DOCUMENTS

| | | | | |
|---|---|---|---|---|
| EP | 001418766 A2 | * | 5/2004 | ............ H04N 13/00 |
| JP | 11-39596 A | | 2/1999 | |
| JP | 2008-129439 A | | 6/2008 | |
| JP | 4378434 B2 | | 9/2009 | |

OTHER PUBLICATIONS

Takeo Kanade, "Development of a Video-Rate Stereo Machine," Nov. 1994, Proceedings of 94 ARPA Image Understanding Workshop.*

* cited by examiner

*Primary Examiner* — Y Lee
*Assistant Examiner* — Joseph Suh
(74) *Attorney, Agent, or Firm* — Dickstein Shapiro LLP

(57) ABSTRACT

There is provided an image pickup apparatus for use in measuring a distance from an observer to a target. The image pickup apparatus includes a case; and a plurality of cameras configured to capture images of the target is fixed in the case. In the image pickup apparatus, the distance from the observer to the target is measured based on the images of the target captured by altering baseline lengths for parallax computation obtained by combining any two of the cameras.

15 Claims, 16 Drawing Sheets

SINGLE-EYE IMAGE

COMPOUND-EYE IMAGE

COMPOSITE IMAGE

ONE SUBSTRATE HAVING PLURAL SENSORS

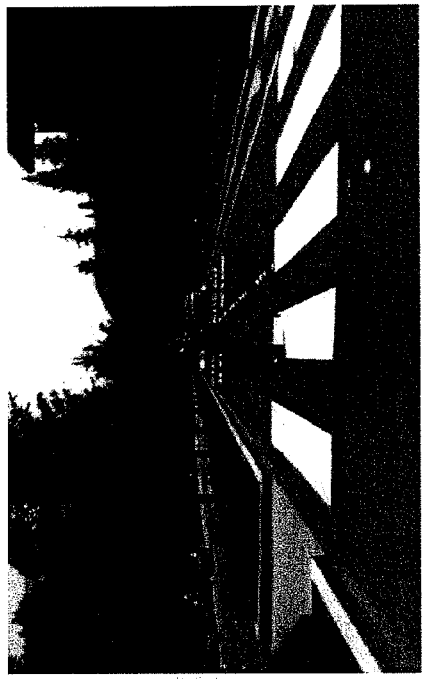
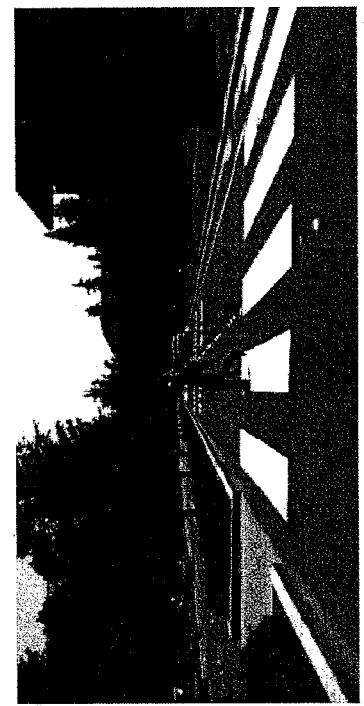
FIG.11
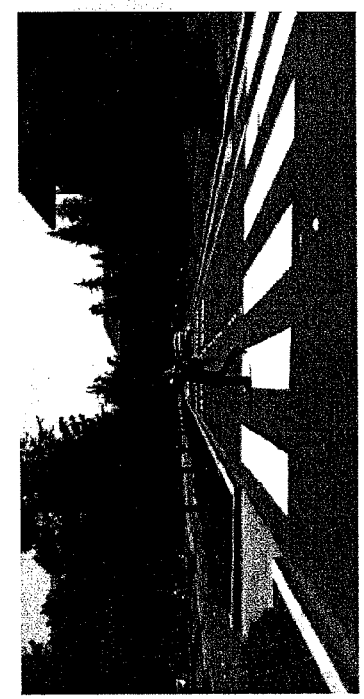
FIG.12

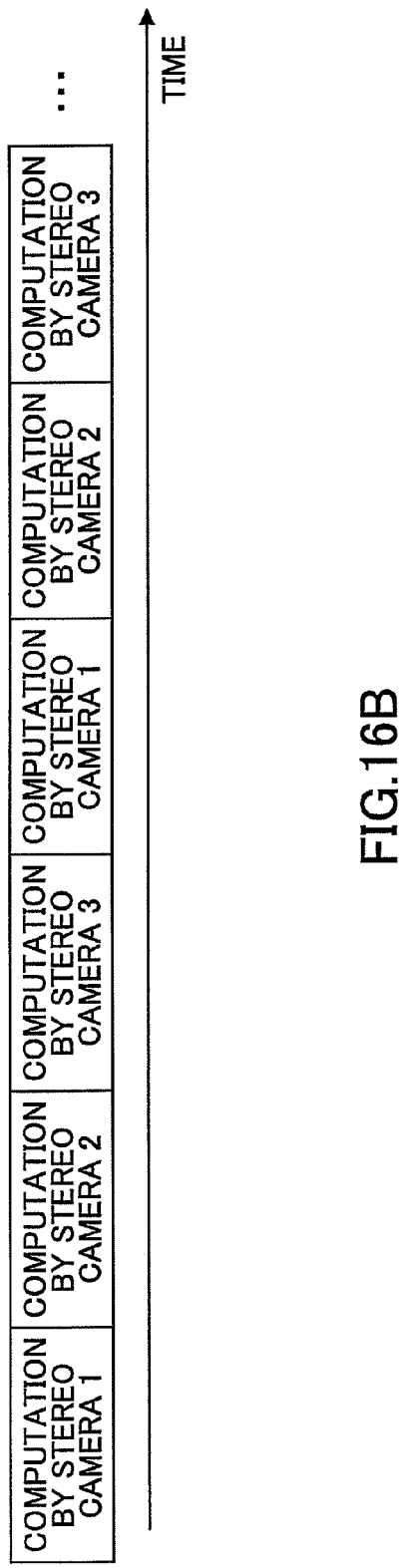
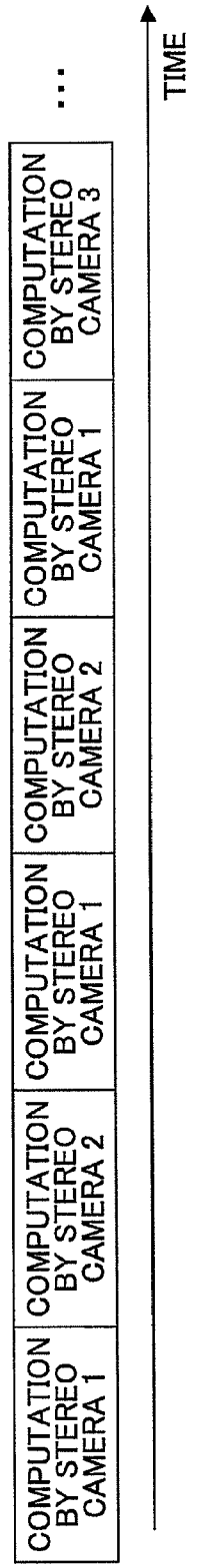

CAPTURED IMAGES OF TARGET

CAPTURED IMAGES OF TARGET

IMAGE PICKUP APPARATUS AND RANGEFINDER, WITH ALTERING BASELINE LENGTHS FOR PARALLAX COMPUTATION OBTAINED BY COMBINING ANY TWO OF A PLURALITY OF CAMERAS

BACKGROUND OF THE INVENTION

1. Field of the Invention

The invention relates to an image pickup apparatus having two or more cameras capable of measuring a distance from an observer to a target and a rangefinder having such an image pickup apparatus.

2. Description of the Related Art

A rangefinder using a stereo camera is configured to take images of a same target from different visual points to measure a position of the target and a distance from an observer to the target based on a change in a distance between image forming points of the target in respective sensors. Recently, there is a growing concern in a driver's awareness of pedestrians in road safety and a driver's support system to attach a stereo camera on a vehicle to provide the driver information on existence of pedestrians in the vicinity of the driver's vehicle, and the like is about to be put in practice.

FIG. 18 illustrates a principle of a stereo camera system. The stereo camera system uses two cameras 31 and 32. In the stereo camera system, a distance Z from the observer to the target is computed based on the following equation:

$$Z=B*f/d \quad (1)$$

where a base length B indicates a distance between the camera 31 and the camera 32, a focus distance f is the camera focal length, a parallax d is the difference between image forming points in one camera obtained from different visual points, and the distance Z indicates a distance from the observer to the target.

However, the parallax of the stereo camera (parallax between the two cameras) decreases with an increase in the distance from the observer to the target, which may result in a large measurement error. When measuring a target at a long distance, accuracy in the distance measurement increases with an increase in the base length B between the two cameras. However, a viewing position from one camera to the target may greatly depart from a viewing position from the other camera to the target based on the positions of the two cameras as illustrated in FIGS. 19A and 19B, and hence searching time to determine the corresponding viewing positions to the target may take a long time. In addition, different aspects of the target are to be viewed from the corresponding camera positions, and hence it may be difficult to determine the corresponding viewing positions to the target. It is difficult to measure a whole distance range between the longest distance and the shortest distance of the observer to the target; however, various related art methods for measuring the whole distance range have been put forward such as a method for measuring the whole distance range using a combination of a stereo camera having a wide-baseline length and a stereo camera having a narrow-baseline length, or a method for measuring the whole distance range by determining the corresponding viewing positions with a narrow baseline length and individually moving the cameras to increase the baseline length to have the widest possible range for capturing the image.

Further, Japanese Patent Application Publication No. 11-39596 (hereinafter also referred to as "Patent Document 1") discloses an external vehicle monitoring apparatus utilizing a short distance stereo camera and a long distance stereo camera. The external vehicle monitoring apparatus having the short distance stereo camera and the long distance stereo camera is capable of measuring a distance from a vehicle to a target in a range of 5 to 100 m by simultaneously operating the two stereo cameras to acquire distance information from the two stereo cameras, thereby detecting a target position at a short distance and a target position at a long distance by software computation. Similarly, Japanese Patent Application Publication No. 2008-129439 (hereinafter also referred to as "Patent Document 2") discloses a multi-camera system configured to have four cameras in one case.

The related art multi-camera system utilizing the combination of the long baseline length stereo camera and the short baseline length stereo camera is capable of measuring a short distance range of 5 to 30 m and a long distance range of 20 to 100 m, which indicates the incapability of measuring a distance range between an ultra-short distance range in millimeters and a long distance range of around 100 m. Further, it is generally expensive to produce the multi-camera system having the combination of the long baseline length stereo camera and the short baseline length stereo camera.

Moreover, it is also difficult to measure a distance range between the ultra-short distance range in millimeters mm and the long distance range of around 100 m by individually moving the cameras to increase the baseline length. In this system, the computation load may be high while determining the corresponding viewing points by moving the cameras. Further, in this system, since the baseline length is increased to the widest possible range to allow both the cameras to capture the target, the baseline length may be extended unduly. Further, unnecessary measuring time may be consumed while moving the cameras in long distance ranges, and calibration of the cameras may be extremely difficult due to the mobility of the cameras.

In the technology disclosed in Patent Document 1, an external vehicle monitoring apparatus includes a short distance stereo camera and a long distance stereo camera to measure a distance from a vehicle to a target by simultaneously operating the two stereo cameras to acquire distance information from the two stereo cameras, and subsequently detect the target position at a short distance and the target position at a long distance by software computation. However, with this technology, it may be difficult to cover a distance range between the ultra-short distance range in millimeters and the long distance range of around 100 m and reduce manufacturing cost.

Note that Japanese Patent No. 4378434 (hereinafter also referred to as "Patent Document 3") discloses a technology utilizing a compound-eye camera having a lens array including plural lenses aligned in a plane and a sensor. The disclosed technology utilizing such a compound-eye camera is capable of measuring an ultra-short distance range in millimeters. However, the compound-eye camera (one compound-eye camera) is incapable of measuring a long distance range despite the capability of measuring the ultra-short distance range in millimeters.

SUMMARY OF THE INVENTION

It is a general object of at least one embodiment of the present invention to provide an image pickup apparatus having a range-finding function (mechanism) capable of efficiently measuring a distance range from an ultra-short distance range in millimeters to a long distance range exceeding 100 m with high accuracy and low cost and a rangefinder system utilizing such an image pickup apparatus that substantially obviates one or more problems caused by the limitations and disadvantages of the related art.

In one embodiment, there is provided an image pickup apparatus for use in measuring a distance from an observer to a target. The image pickup apparatus includes a case; and a plurality of cameras configured to capture images of the target is fixed in the case. In the image pickup apparatus, the distance from the observer to the target is measured based on the images of the target captured by altering baseline lengths for parallax computation obtained by combining any two of the cameras.

In another embodiment, there is provided a rangefinder that includes the image pickup apparatus.

BRIEF DESCRIPTION OF THE DRAWINGS

Other objects and further features of embodiments will be apparent from the following detailed description when read in conjunction with the accompanying drawings, in which:

FIG. 11 is a pair of stereo camera image examples captured by different cameras having different angles of view and focus distances;

FIG. 12 is a pair of linearly-transformed stereo camera image examples of FIG. 11;

FIGS. 16A and 16B are timing charts illustrating operations for selecting stereo camera images;

DESCRIPTION OF THE PREFERRED EMBODIMENTS

In the following, preferred embodiments of the present invention are described with reference to the accompanying drawings.

The embodiments pertain to a configuration of an image pickup apparatus utilized in a rangefinder that exhibits the following features. The image pickup apparatus according to an embodiment is configured to include plural compound-eye cameras having lens arrays arranged in a case (camera unit) so that the image pickup apparatus is capable of measuring a distance range from an ultra-short distance to a long distance with high accuracy. An image pickup apparatus according to another embodiment is configured to include the above plural compound-eye cameras and plural compound-eye cameras having lens shapes differing from those of the plural compound-eye cameras or plural noncompound-eye cameras arranged in a case (i.e., a camera unit) so that the image pickup apparatus is capable of measuring a distance range from an ultra-short distance to a long distance with high accuracy.

An image pickup apparatus according to another embodiment is configured to include plural cameras having different angles of view and focus distances arranged in a case (camera unit) and a logic section to convert images into an integrated image so that the image pickup apparatus is capable of selecting any length of the baseline length to measure a distance range from an ultra-short distance to a long distance with high accuracy. An image pickup apparatus according to another embodiment is configured such that combinations of baseline lengths are computed by one distance measuring algorithm so that the image pickup apparatus may be produced at low cost.

[Embodiments]

The features of the embodiments are described below, with reference to the accompanying drawings.

Figure 3A:
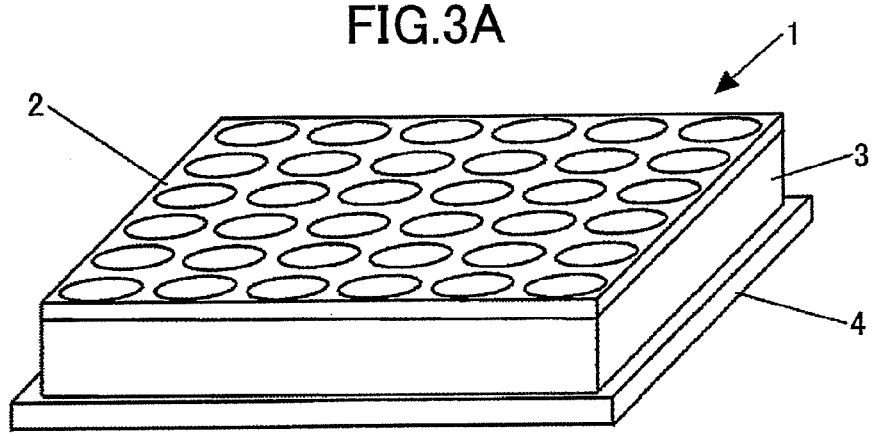
FIGS. 3A, 3B, and 3C are diagrams illustrating a configuration of the compound-eye camera including a lens array.

FIG. 3A is a diagram illustrating a configuration of a compound-eye camera including a lens array. As illustrated in FIG. 3A, a compound-eye camera 1 is configured to include a lens array 2 having plural lenses arranged in a plane, a sensor 3, and a substrate (printed circuit board) 4. The sensor 3 is configured to include an optical filter having plural regions in a lattice-like arrangement and an image pickup element such as a CCD or a CMOS. The plural images obtained via the plural lenses of the sensor 3 in FIG. 3A are integrated to form an image on the image pickup element. The number of lenses in the lens array 2 illustrated in FIG. 3A is only an example and may include two or more lenses.

Figure 3B:
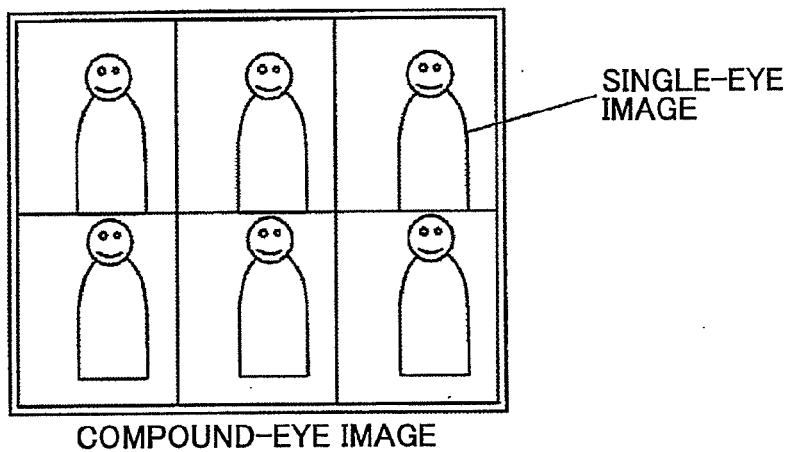
Figure 3C:
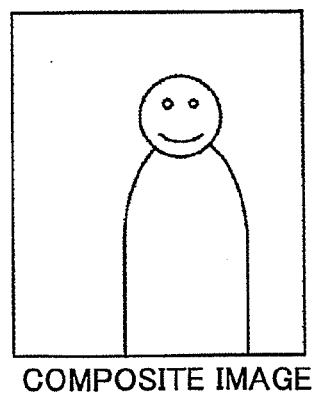

FIG. 3B illustrates an example of images obtained by the sensor 3 in a case where the number of lenses in the lens array 2 of the compound-eye camera 1 is 6. In FIG. 3B, plural (i.e., six in this case) images formed on the entire sensor 3 is called a compound-eye image and each of the plural images formed on the sensor 3 is called a single-eye image. In the compound-eye camera 1, each of the single-eye images includes a parallax, so that a distance from the image pickup apparatus 10 to the target may be measured by carrying out parallax computation on the single-eye images. FIG. 3C illustrates a composite image obtained by combining the single-eye images in a size of the sensor 3.

[First Embodiment]

Figure 1:
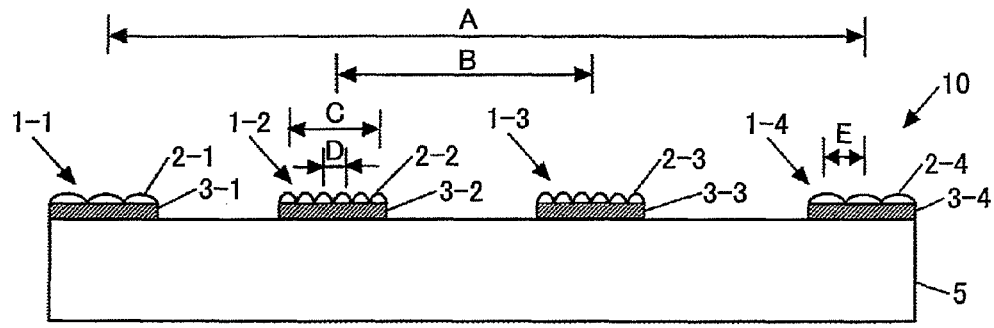
FIG. 1 is a schematic diagram illustrating an image pickup apparatus utilizing plural compound-eye cameras according to a first embodiment.

FIG. 1 is a diagram illustrating an image pickup apparatus (a compound-eye stereo camera) according to a first embodiment that utilizes plural compound-eye cameras having the configuration illustrated in FIG. 3A. The image pickup apparatus according to a first embodiment includes a set of two compound-eye cameras 1-1 and 1-4 having the same lens shape, and a set of two compound-eye cameras 1-2, and 1-3 having lens shapes differing from the lens shape of the compound-eye cameras 1-1 and 1-4. The two sets of the compound-eye cameras are arranged in a case (i.e., a camera unit) to form the image pickup apparatus (compound stereo eye camera). The compound-eye cameras 1-1, 1-2, 1-3, and 1-4 include respective lens arrays 2-1, 2-2, 2-3 and 2-4, and respective sensors 3-1, 3-2, 3-3 and 3-4 (substrate is not shown) in a manner similar to the compound-eye camera 1 illustrated in FIG. 3A.

Note that with only one compound-eye camera 1 illustrated in FIG. 3A, it is difficult to set the baseline length B at a size greater than the size of the sensor 3 in the following equation (1) assigned for computing a distance Z based on the parallaxes obtained by the two cameras described above.

$$Z = B*f/d \qquad (1)$$

Further, with the compound-eye camera, the image of the target is formed on each pixel of the sensor 3, which makes the focus distance f of the compound-eye camera to be extremely short. Thus, the values for the baseline length B and the focus distance f in the above equation (1) may not be increased at the same time. As a result, although it is possible to measure an ultra-short distance range between the observer and the target, it is not possible to measure a long distance range between the observer and the target.

For example, if the baseline length B of approximately 3 mm and the focus distance of approximately 2 mm are secured within the sensor 3, the "B*f" part of the equation (1) is computed as follows. That is, B*f=3*2=6. If, for example, this applies to a case where the parallax d is 50 and a pixel size is 3 μm, the distance Z will become 40 mm. If the parallax is 49, the distance Z will become 40.8 mm. Thus, it is possible to measure the ultra-short distance range of 1 mm or less with high accuracy within one pixel error.

In order to measure a long distance range such as 100 m, the parallax d may need be 0.02. In this case, the parallax needs to be computed based on a 2/100 pixel, and hence it is difficult to carry out such measurement in practice. Further, if the parallax d has an error of 0.01 and the parallax d is 0.3, and the measured distance Z is approximately 67 m; and if the parallax d is 0.1, the distance Z will be approximately 200 m. Thus, it is difficult to realize the measurement with practical accuracy. Moreover, with an ordinal stereo camera configuration without having a compound-eye camera as illustrated in Patent Document 1, even if the long distance camera and the short distance camera are separately provided in the stereo camera, the short distance range to be measured may be limited in a range of 1 to 5 m.

By contrast, in the image pickup apparatus having plural compound-eye cameras according to the first embodiment illustrated in FIG. 1, a distance range of 20 to 100 m may be measured based on composite images captured by the sensors 3-1 and 3-4 of the respective compound-eye cameras 1-1 and 1-4 capable of forming the baseline length A; a distance range of 50 cm to 5 m is measured based on single-eye images or a composite image captured by the sensor 3-4 of the compound-eye camera 1-4 also capable of forming the baseline length E. The image pickup apparatus according to the first embodiment further includes compound-eye cameras 1-2 and 1-3 having lens arrays 2-2 and 2-3 with lens shapes differing from the lens shapes of the lens arrays 2-1 and 2-4 of the compound-eye cameras 1-1 and 1-4 capable of forming the baseline lengths A and E, and having more lenses than the lens arrays 2-1 and 2-4 of the compound-eye cameras 1-1 and 1-4 in the same case (camera unit) 5. Accordingly, the image pickup apparatus having the compound-eye cameras 1-1 and 1-4 and the compound-eye cameras 1-2 and 1-3 is capable of capturing highly defined single-eye images. With the compound-eye cameras 1-2 and 1-3 of the image pickup apparatus, a distance range of 1 mm to 50 cm may be measured based on single-eye images captured by the sensor 3-2 of the compound-eye camera 1-2 capable of forming the baseline length D; a distance range of 50 cm to 2 m may be measured based on single-eye images captured by the sensor 3-2 of the compound-eye camera 1-2 capable of forming the baseline length C; and a distance range of 5 to 20 m may be measured based on single-eye images or composite images captured by the sensor 3-2 and 3-3 of the two compound-eye camera 1-2 and 1-3 capable of forming the baseline length B. With this configuration, all the distance ranges may be measured with equal accuracy based on percentage conversion. Further, the compound-eye cameras may have different pairs of compound-eye cameras having different focus distance ranges.

Figure 2:
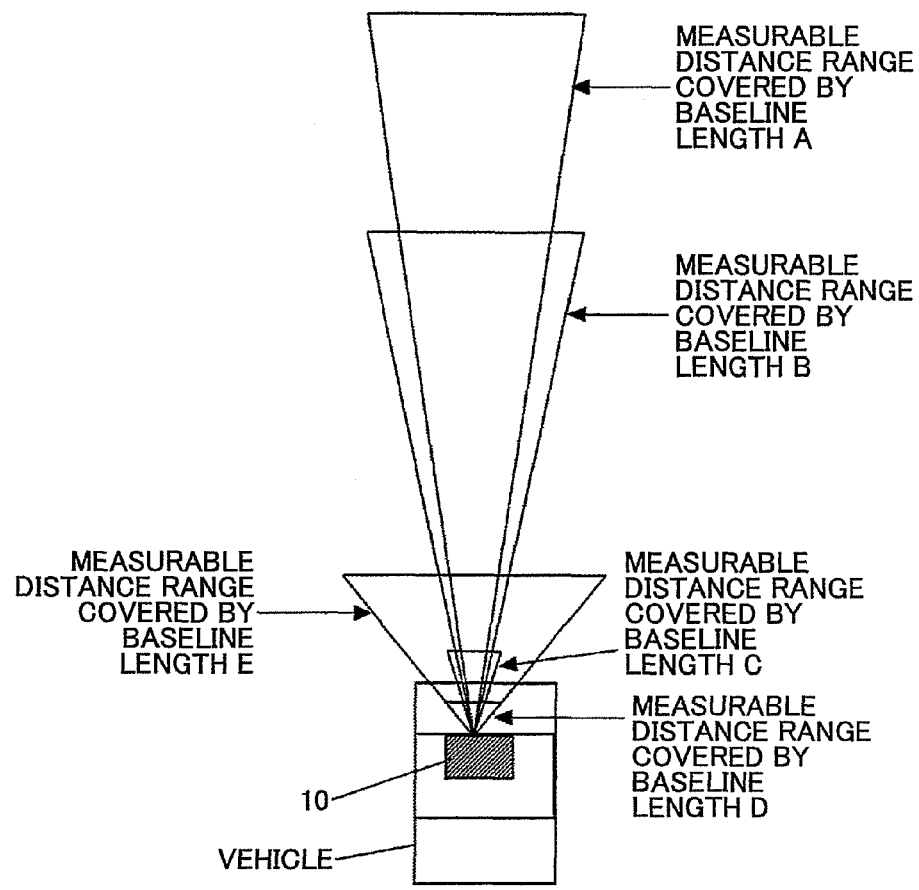
FIG. 2 is a diagram illustrating forward-side distance ranges measured by an on-vehicle rangefinder utilizing the image pickup apparatus illustrated in FIG. 1.

FIG. 2 is a diagram illustrating forward-side distance ranges measured by an on-vehicle rangefinder utilizing the image pickup apparatus 10 illustrated in FIG. 1.

As illustrated in FIG. 2, in an on-vehicle environment, if the target resides at a long distance, only a narrow angle of view may be required; however, if the target resides in a shorter distance, a wider angle of view may be required. Accordingly, a typical on-vehicle rangefinder utilizing the image pickup apparatus 10 may be configured to include different angles of view by changing configurations of the micro-lenses in the respective compound-eye cameras. The configuration disclosed in Patent Document 1 is based upon the assumption that the short distance camera and the long distance camera include respective lens-sensor pairs having the same camera design values such as an angle of view or a focus distance. However, in the image pickup apparatus according to the first embodiment, the camera design values may differ in each of the short distance camera and the long distance camera as described above, and hence a measurable distance range may be flexibly covered. Alternatively, the image pickup apparatus according to the first embodiment may further include lens-sensor pairs capable of covering distance ranges that are not limited by the baseline lengths A to E, thereby covering further detailed measurable ranges.

Figure 4:
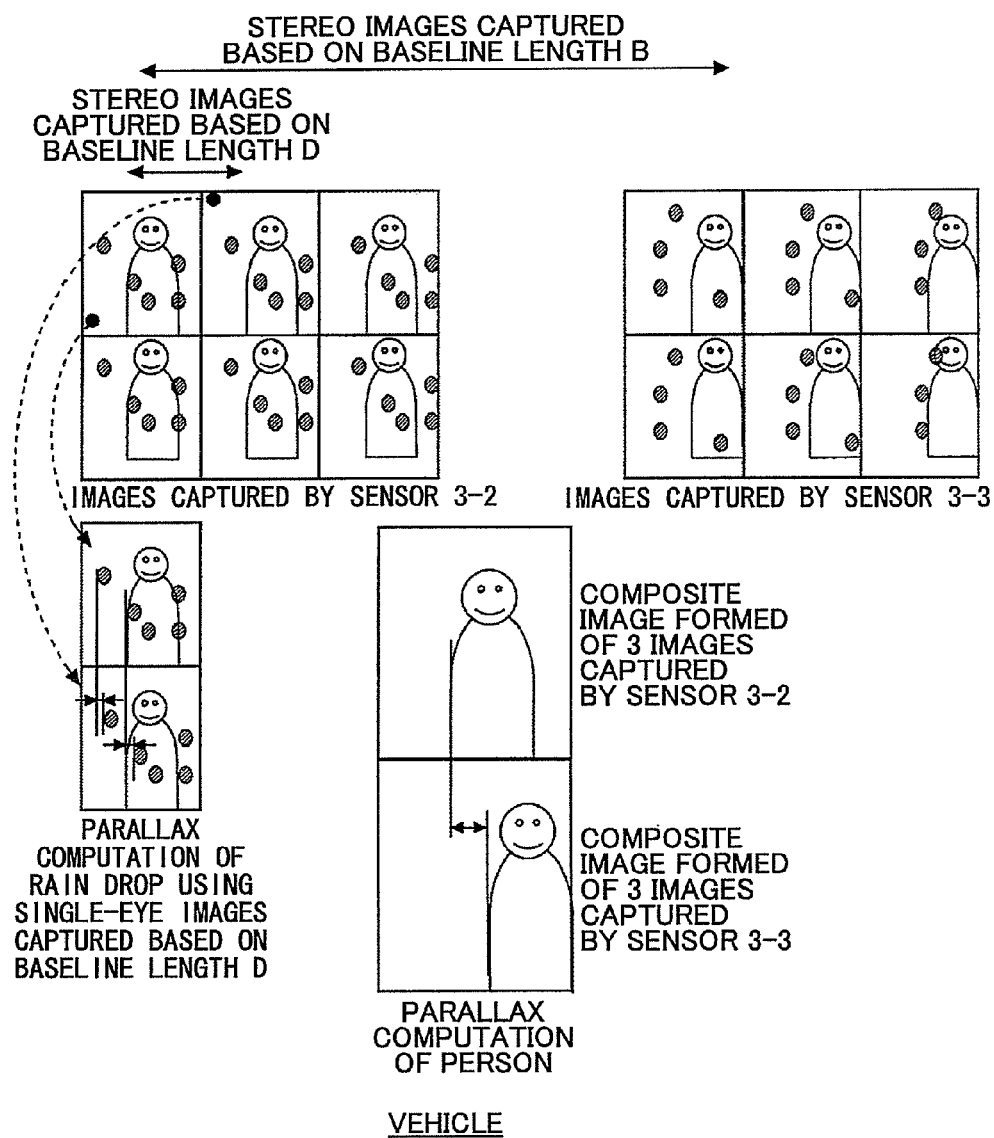
FIG. 4 is a diagram illustrating a process in which a forward-side distance from a vehicle (observer) to a target is measured based on images captured by two compound-eye cameras when the image pickup apparatus having the two compound-eye cameras according to the first embodiment illustrated in FIG. 1 is attached to a rear-view mirror.

FIG. 4 is a diagram illustrating an example of a process in which a forward-side distance from a vehicle (observer) to a target is measured based on images captured by the sensor 3-2 of the compound-eye camera 1-2 and the sensor 3-3 of the compound-eye camera 1-3 when the image pickup apparatus having the two compound-eye cameras 1-2 and 1-3 according to the first embodiment illustrated in FIG. 1 is attached to a rear-view mirror of the vehicle. In this example, three lens arrays are arranged on an upper surface of the sensor and three lens arrays are arranged on a lower surface of the sensor; that is, the example employs a hexagonal compound-eye camera having 6 lenses and one sensor. In this example, a target includes a person externally present in front of the vehicle and raindrops attached to a front glass of the vehicle.

The single-eye images captured by the sensor 3-2 are stereo processed based on the baseline length D of the compound-eye camera 1-2. As described above, the stereo process is carried out for measuring a distance range of 1 mm to 50 cm. That is, the stereo process is carried out based on the baseline length D of the compound-eye camera 1-2 in order to detect the raindrops attached on the front glass of the vehicle. The raindrops are generally considered extremely difficult to detect for a monocular camera employing a shape recognition system. Since the targets (raindrops) attached to positions corresponding to the front glass of the vehicle are obtained by detecting parallaxes of the raindrops in the above manner, it may be possible to automatically activate wipers of the vehicle to wipe the raindrops.

Further, three images captured by the sensor 3-2 and three images captured by the sensor 3-3 are combined (i.e., undergo a composite process) in order to carry out parallax computation on each of the images based on the baseline length D. The composite process may be carried out by averaging pixels of the combining images. In this example, the composite process is carried out using a generally known low pass filter, which is capable of excluding ultra-near objects such as raindrops exhibiting dynamic motional discrepancies between the single-eye images.

By carrying out parallax computation on the composite image obtained based on the images captured by the sensors 3-2 and 3-3, the parallax of the target residing at a long distance (the person standing in front of the vehicle in FIG. 4) may be detected. Note that the single-eye images of the target person standing in front of the vehicle captured by the sensor 3-2 provide little parallaxes between the single-eye images. In this case, the parallax computation may be carried out between the single-eye images captured by the sensor 3-2 and between those captured by the sensor 3-3, separately. However, the parallax computation may be carried out by eliminating the ultra-near objects such as raindrops, using the composite image including the single-eye images of the sensor 3-2 and those of the sensor 3-3. Moreover, the target at a long distance may be captured with numerous pixels. Further, the image pickup apparatus according to the first embodiment may be configured to carry out parallax computation by automatically selecting use or non-use of the composite image.

[Second Embodiment]

Figure 5:
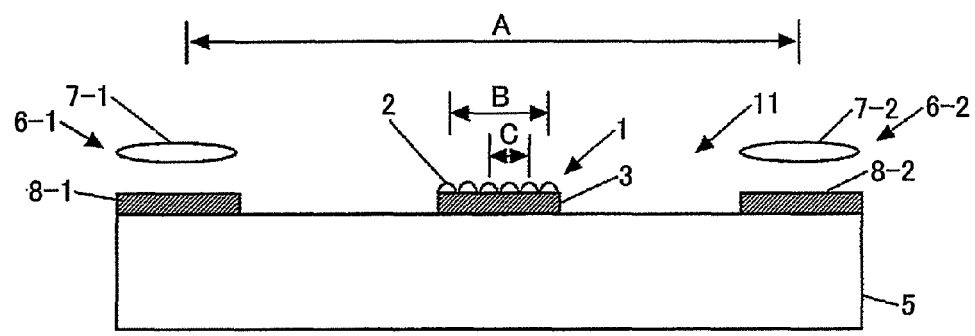
FIG. 5 is a schematic diagram illustrating an image pickup apparatus utilizing a compound-eye camera and two noncompound-eye cameras according to a second embodiment.

FIG. 5 is a diagram illustrating an example of an image pickup apparatus 11 according to a second embodiment that utilizes the compound-eye camera illustrated in FIG. 3A and two noncompound-eye cameras 6-1 and 6-2. In this case, since the cameras 6-1 and 6-2 having noncompound-eye lenses 7-1 and 7-2 do not use the composite image, the images captured by the sensors 8-1 and 8-2 have higher resolution. Thus, the number of sensors may be reduced compared to the number of sensors used in the image pickup apparatus 10 according to the first embodiment in FIG. 1. Compared to the configuration of FIG. 1, the configuration illustrated in FIG. 5 is capable of implementing accuracy in a longer distance measurement, and the accuracy in the ultra-short (near) distance measurement equal to or more than that obtained by the configuration of FIG. 1. However, the configuration illustrated in FIG. 5 may lower accuracy in an intermediate distance measurement covered by the baseline lengths B and E illustrated in FIG. 1. Moreover, with the configuration illustrated in FIG. 5, the angle of view of the target residing at a short distance (from the observer) may be narrower than that obtained in the configuration illustrated in FIG. 1. However, with the configuration illustrated in FIG. 5, the image pickup apparatus may be simply and advantageously manufactured at low cost. As described above, the numbers of compound-eye cameras and noncompound-eye cameras may be flexibly determined based on the target subject to distance measurement, purpose of distance measurement, and required accuracy.

Further, in the image pickup apparatuses having above configurations, plural composite images having different resolutions may be formed using the plural single-eye images captured by the compound-eye cameras based on the accuracy required for the distance measurement, and the distance measurement may be carried out by switching the plural composite images.

[Third Embodiment]

Figure 6:
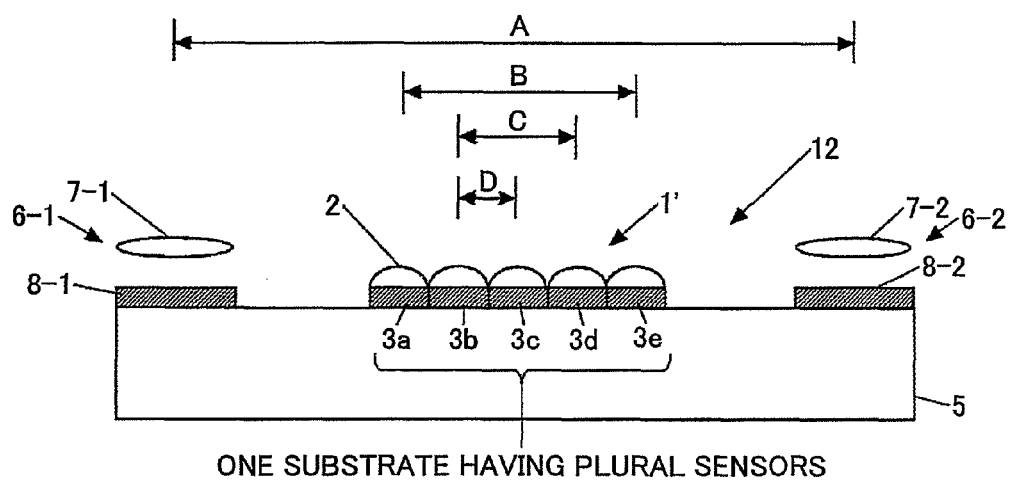
FIG. 6 is a schematic diagram illustrating an image pickup apparatus utilizing a compound-eye camera including a substrate and plural sensors embedded in the substrate and two noncompound-eye cameras according to a third embodiment.

FIG. 6 is a schematic diagram illustrating an image pickup apparatus according to a third embodiment that utilizes a compound-eye camera 1' including a substrate and plural sensors 3a, 3b, 3c, 3d, and 3e embedded in the substrate and two noncompound-eye cameras 6-1 and 6-2. As illustrated in FIG. 6, the compound-eye camera 1' is configured to include the separate sensors 3a, 3b, 3c, 3d, and 3e each capturing images via the lens array 2 having plural lenses arranged in a plane. Note that with the compound-eye camera formed of one substrate and the lens arrays 2 that form a wafer is configured to cover one of the baseline lengths B to D illustrated in FIG. 1 or 5. Accordingly, it is difficult for the compound-eye camera to cover the baseline length equal to or wider than the sensor size.

In order to overcome such drawbacks, an image pickup apparatus 12 according to the third embodiment is configured to include a configuration illustrated in FIG. 6. With such a configuration, since the baseline lengths B to D illustrated in FIG. 6 are configured to cover distance ranges wider than the baseline lengths B to D illustrated in FIG. 1 or 5, accuracy in the distance measurement may be increased in a distance range of 1 to 10 m. In addition, in a case where the image pickup apparatus includes plural sensors, calibration cost (e.g., time cost, apparatus cost, and component cost) may largely be increased. However, since the image pickup apparatus according to the third embodiment includes the configuration illustrated in FIG. 6 in which the lens arrays 2 each are uniformly formed with the corresponding one of the sensors 3a to 3e, it is possible to largely reduce calibration cost in the third embodiment. Specifically, with this configuration illustrated in FIG. 6, external parameters for 3-axial rotation and translational motions in three directions of each camera including one of the sensors 3a to 3e and one of lens arrays 2 of the compound-eye camera 1' do not have large discrepancies between the cameras. Thus, it is possible to simplify calibration in the third embodiment.

[Fourth Embodiment]

Figure 7:
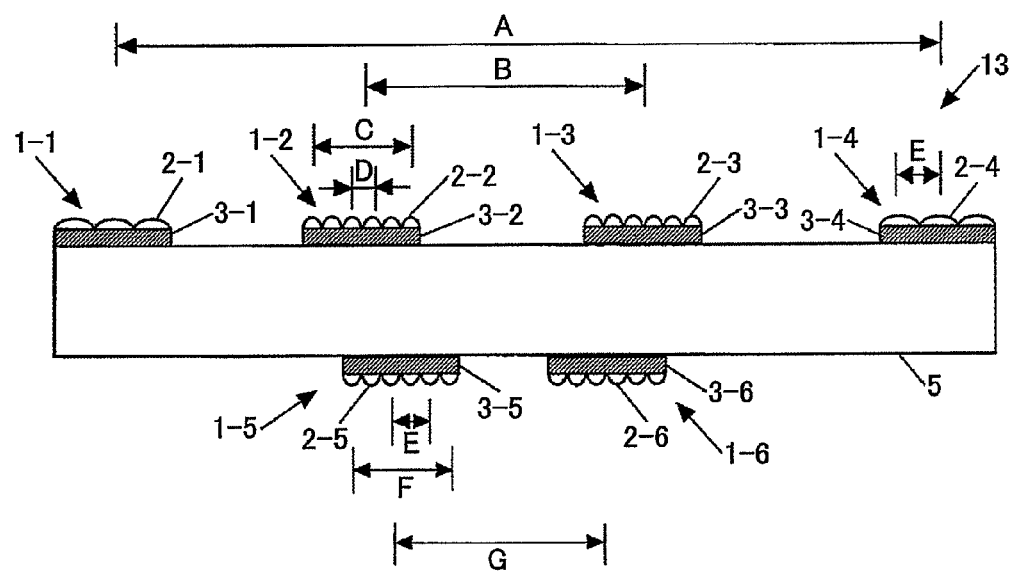
FIG. 7 is a schematic diagram illustrating an image pickup apparatus utilizing two or more compound-eye cameras arranged on both sides of a case (camera unit) according to a fourth embodiment.

In the image pickup apparatuses according to the first to third embodiments described above, one or more compound-eye cameras and noncompound-eye cameras are arranged in the same directions and they are mounted in one case (camera unit) 5. By contrast, an image pickup apparatus 13 according to a fourth embodiment illustrated in FIG. 7 further includes, in addition to the configuration of FIG. 1, distance measuring compound-eye cameras 1-5 and 1-6 arranged in directions differing from the directions in which the cameras are arranged as illustrated in FIG. 1. Accordingly, the image pickup apparatus 13 according to the fourth embodiment having the above configuration is, if attached to the rear-view mirror of the vehicle to be used as an on-vehicle rangefinder, capable of detecting an object in front (in the forward-side) of the vehicle using images and distance measurement data computed based on the baseline lengths A and B, capable of detecting rain droplets attached to the front glass of the vehicle using images and distance measurement data computed based on the baseline lengths C and D, and capable of detecting passengers of the vehicle using images and distance measurement data inside the vehicle computed based on the baseline lengths E, F and G.

[Fifth Embodiment]

Figure 8:
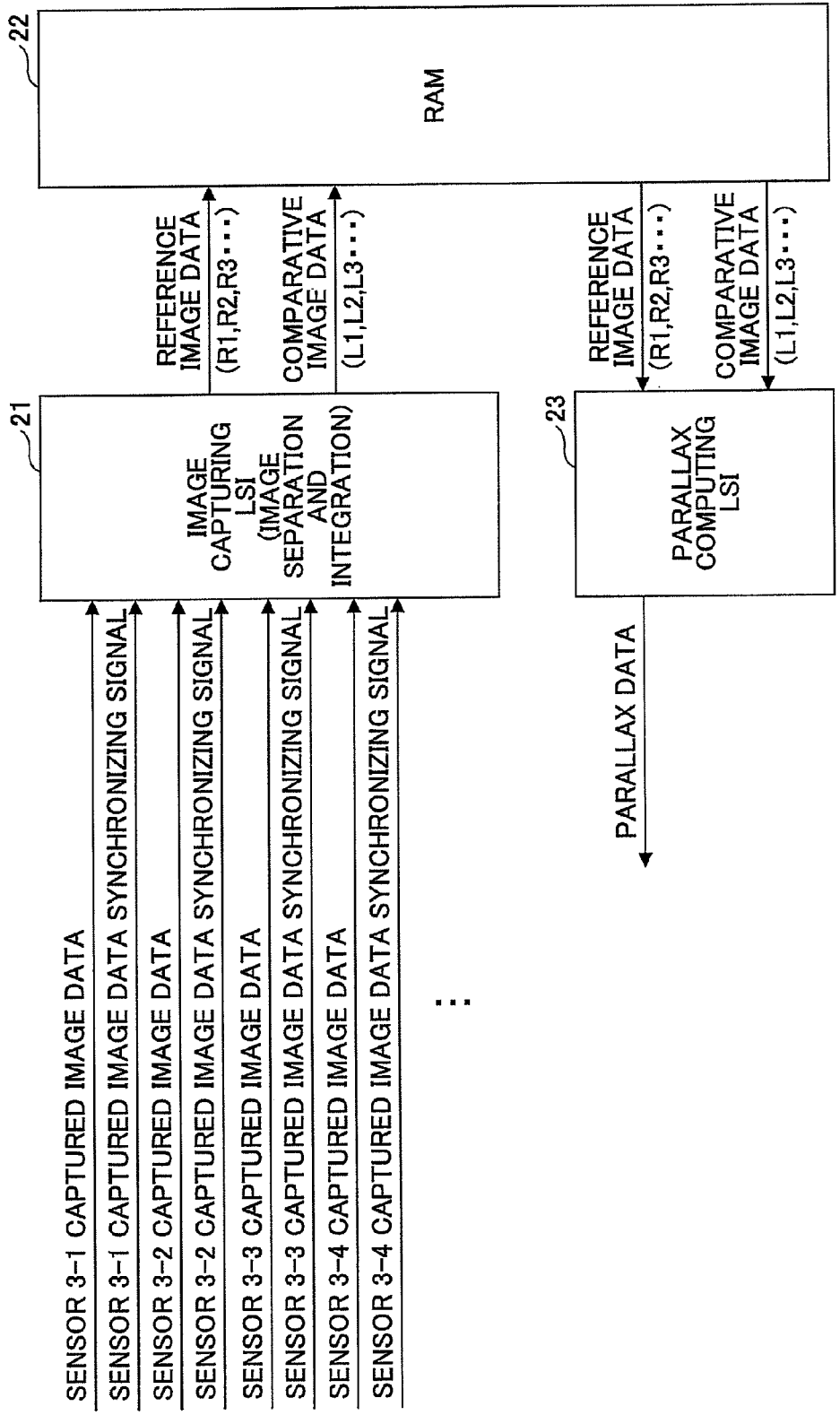
FIG. 8 is a block diagram illustrating a circuit configuration to process plural camera images captured by the image pickup apparatus according to the embodiments.

FIG. 8 is a block diagram illustrating a circuit configuration to process plural camera images captured by the image pickup apparatus according to the first to fourth embodiments described above. The camera images are generally including vertical synchronization signals VSYNC or horizontal synchronization signals HSYNC, and several data lines. In this case, if the plural camera images are processed by one large-scale integrated circuit (LSI), numerous pins are required for the LSI. Thus, the circuit configuration may be implemented as a large chip for a microcomputer.

Thus, the image pickup apparatus according to a fifth embodiment is configured to include one dedicated LSI (i.e., image capturing LSI) 21 utilized as an image separation-integration circuit configured to receive the images, select (separate) one or more of the images to be sent to a memory (RAM) 22 or integrate the images inside the image capturing LSI 21 so as to write two sets of image data (i.e., reference image data and comparative image data) used for parallax computation in the memory (RAM) 22.

As illustrated in the following equation (2), the parallax computation is carried out by dividing the two images into blocks and figuring out a correlation between the divided image blocks. Thus, one parallax computation requires a reference image for detecting a position of a target (object) and a comparative image for computing the parallaxes between the reference image and comparative image. That is, the image capturing LSI 21 is configured to select (separate) the reference image and the comparative image required for one parallax computation, sort a data flow of the selected image and store (write) the sorted image in the memory (RAM) 22.

$$R_{SAD} = \sum_{j=0}^{N-1} \sum_{i=0}^{N-1} |I(i, j) - T(i, j)| \wedge \wedge \quad (2)$$

where i and j represent positions within a block, I(i, j) represents luminance at coordinates (i, j) of the reference image, and T represents luminance at coordinates (i, j) of the comparative image.

FIG. 8 illustrates a configuration in which a parallax computing LSI 23 utilized as a parallax process circuit is configured to read the two sets of image data (i.e., reference image data and comparative image data) from the RAM 22 to carry out parallax computation based on the read reference image data and comparative image data. In this case, if images are supplied to the parallax computing LSI 23 and the image pickup apparatus (rangefinder) has a line memory sufficient to carry out parallax computation, the images may be supplied directly to the parallax computing LSI 23 without allowing the memory (RAM) 22 to store the images obtained as process results of the image capturing LSI 21.

As described above, since the image capturing LSI 21 configured to capture an image is provided as the dedicated unit separated from the parallax computing LSI 23 in the configuration of FIG. 8, the existing parallax computing LSI may be used or the number of camera images supplied may be increased.

[Sixth Embodiment]

Figure 9:
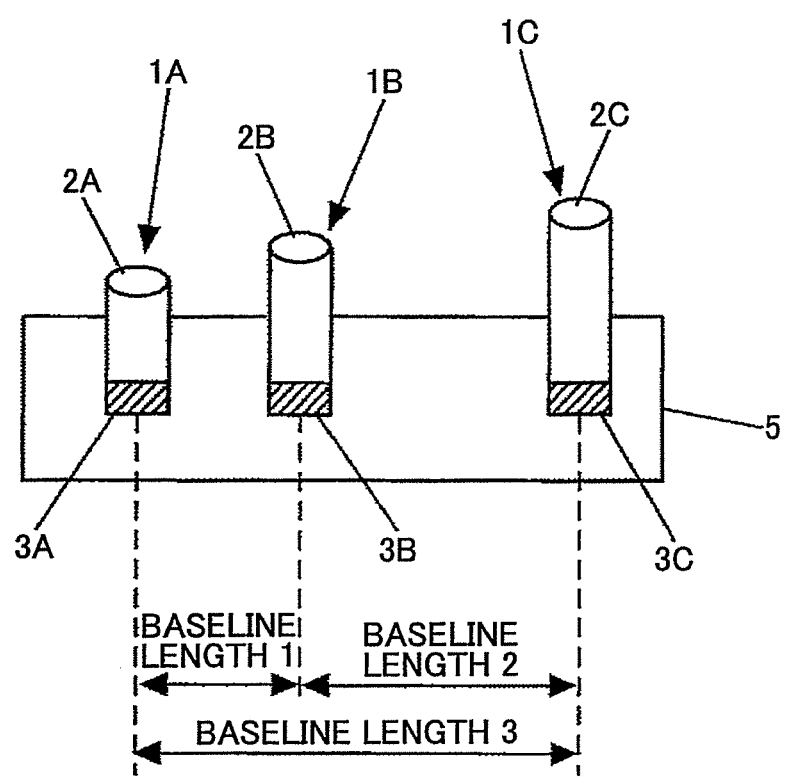
FIG. 9 is a schematic diagram illustrating an image pickup apparatus according to a sixth embodiment.

FIG. 9 illustrates an image pickup apparatus according to a sixth embodiment that includes a case 5, and three or more cameras (each camera having a lens and a sensor) having different angles of view and different focus distances arranged in the case 5. As illustrated in FIG. 9, the image pickup apparatus according to the sixth embodiment includes the case 5 and cameras 1A, 1B, and 1C. The camera 1A has a lens 2A and a sensor 3A, the camera 1B has a lens 2B and a sensor 3B, and the camera 1C has a lens 2C and a sensor 3C. With this configuration, three baseline lengths of the stereo camera may be acquired for carrying out parallax computation. The stereo camera set having the long baseline length is configured to measure a distance from the observer to the target arranged at a long distance, whereas the stereo camera sets having the short baseline lengths are configured to measure short to long distance ranges; that is, a distance range from the observer to an object arranged in the short distance and a distance range from the observer to an object arranged in the long distance. That is, as illustrated in FIG. 9, the stereo camera set having the baseline length 1 is configured to measure a short distance, the stereo camera set having the baseline length 2 is configured to measure an intermediate distance, and the stereo camera set having the baseline length 3 is configured to measure a long distance.

Figure 10:
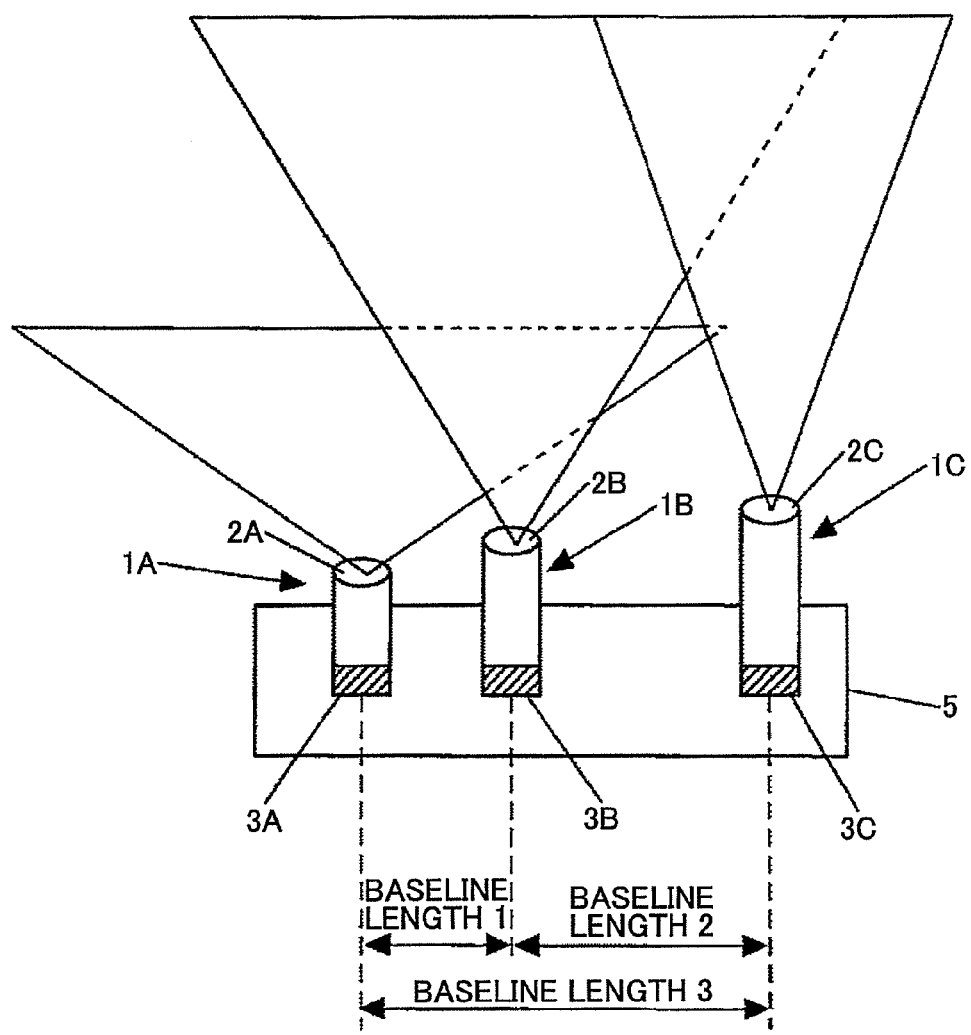
FIG. 10 is a diagram illustrating the image pickup apparatus according to the sixth embodiment that acquires different image capturing ranges based on different angles of view of the different cameras.

FIG. 10 is a diagram illustrating the image pickup apparatus according to the sixth embodiment that acquires different image capturing ranges based on different angles of view of the different cameras. FIG. 11 illustrates an example of a stereo camera image pair captured by the stereo camera pair having the baseline length 1 shown in FIG. 10 provided inside the vehicle for monitoring a forward side of the vehicle.

In order to carry out parallax computation on the image pair illustrated in FIG. 11, epipolar geometry or the like may be applied to the parallax computation, which may need a long period of time for computation. However, if the camera image pair is an ideal pinhole image pair, linear external parameter conversion based on the design values or enlargement-reduction conversion may be carried out based on the focus distance, the angle of view, and size of the sensor, thereby parallelizing the cameras image pair.

FIG. 12 illustrates an example of the image pair obtained based on the above idea in which the camera images are linearly converted into images having predetermined camera design values (angle of view, focus distance and sensor size). As illustrated in FIG. 12, the image pair has an object (e.g., a person) having a predetermined size.

Figure 13:
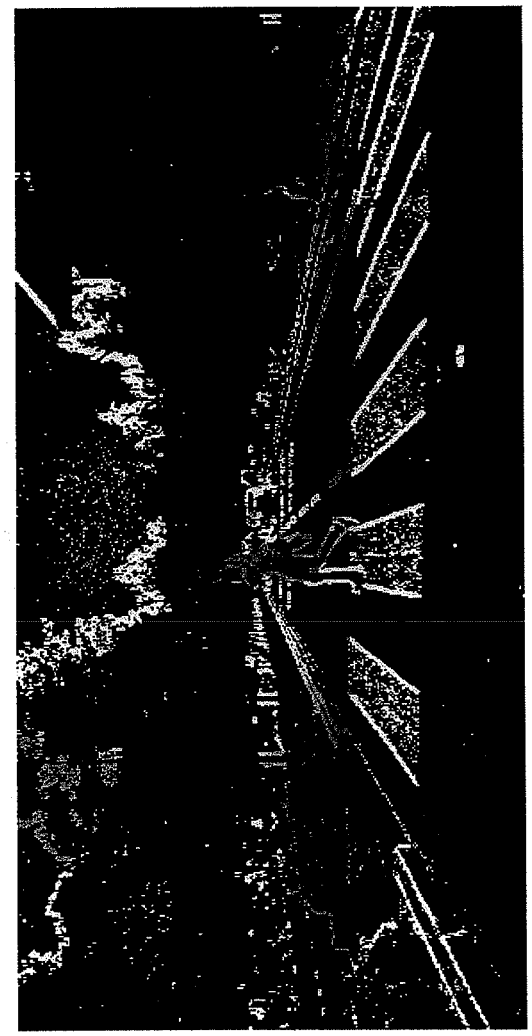
FIG. 13 is a parallax image example obtained by carrying out parallax computation on the pair of linearly-transformed stereo camera image examples of FIG. 12.

In this case, a simple method of parallel stereo parallax computation is carried out for acquiring highly defined parallax data illustrated in FIG. 13.

Figure 14:
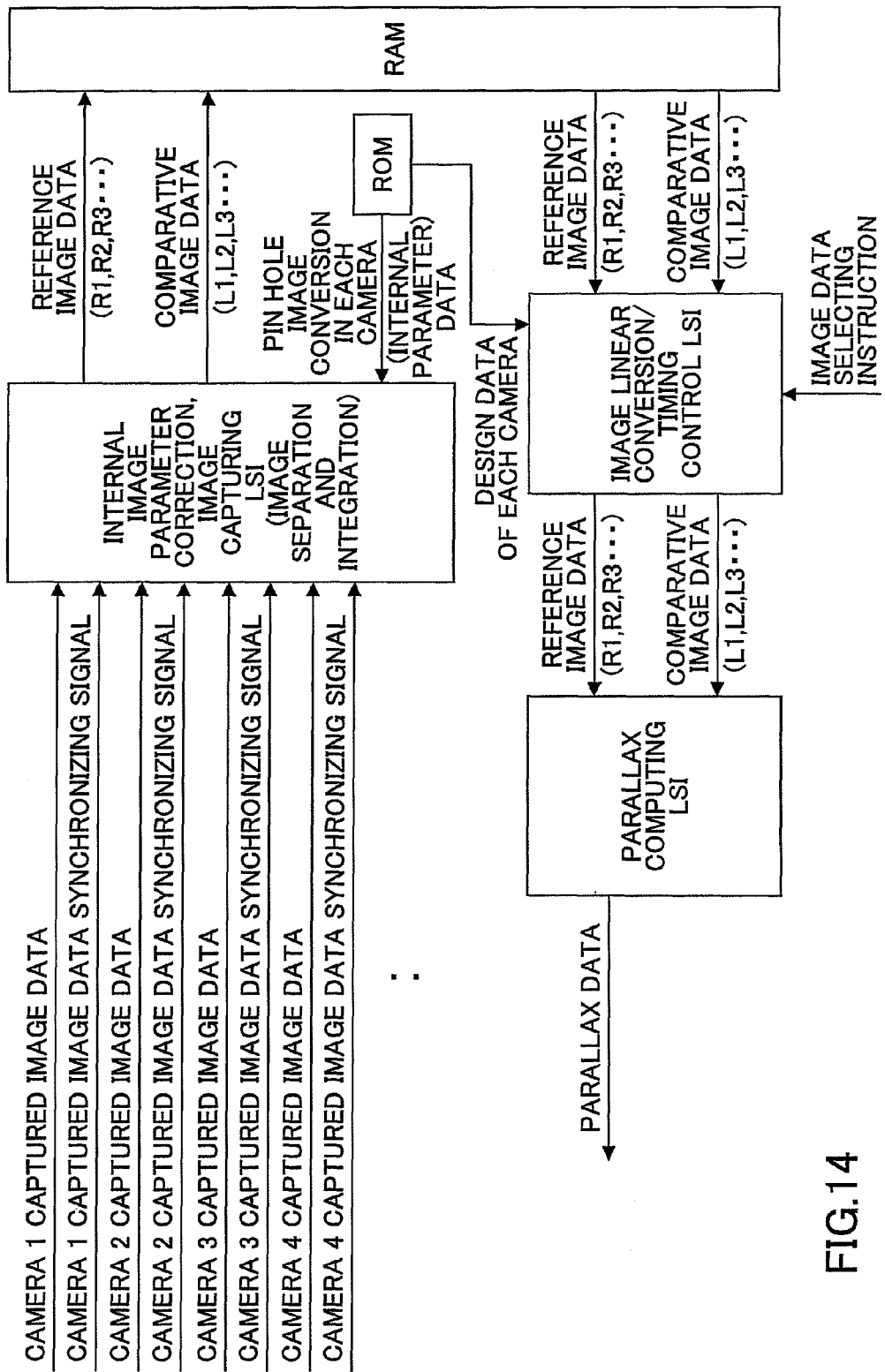
FIG. 14 is a block diagram illustrating a circuit configuration to process plural camera images captured by the image pickup apparatus according to the embodiments.

FIG. 14 is another example of the block diagram illustrating a circuit configuration to process plural camera images captured by the image pickup apparatus according to the embodiments. As illustrated in FIG. 14, the image undergoes pinhole image conversion utilizing calibration data used for pinhole image conversion carried out on the image captured by each camera stored in the ROM. In this process, the image capturing LSI is configured to convert the images captured by the respective cameras into idealized pinhole images and output the pinhole images. In addition, as another method for pinhole image conversion, a higher order polynomial conversion method utilizing a LUT (lookup table) may be given. Note that in either method described above, non-linear conversion is carried out.

Control operations carried out in this embodiment are described with reference to FIG. 14. In FIG. 14, an image linear conversion/timing control LSI reads the camera image pair from the RAM to carry out parallax computation on the read camera image pair. As illustrated in FIG. 14, the image linear conversion/timing control LSI reads design data (focus distance and angle of view) for each camera from the ROM to be loaded in an internal register and carries out image linear conversion on the read camera image pair based on the read design data. In this process, the design data may alternatively be set in the internal register directly from outside instead of reading from the ROM.

Based on the design data, linear conversion is carried out on the camera image pair utilizing the reference camera design value. The linear conversion is generally carried out by a simple matrix operation of 3*3. Since each of the linearly converted camera image data sets may be treated as the same pinhole camera image, any of the camera pairs may carry out computation utilizing one parallax computation algorithm.

Accordingly, one parallax computing LSI may be provided as a logic section. In this embodiment, plural stereo images having various angles of view and focus distances may be computed utilizing a common parallax computation algorithm by time sharing.

As illustrated in FIG. 14, if images are supplied to the parallax computing LSI and the image pickup apparatus (rangefinder) has a line memory sufficient to carry out parallax computation, the images may be supplied directly to the parallax computing LSI and the image linear conversion/timing control LSI without allowing the memory (RAM) to store the images obtained as process results of the image capturing LSI. As described above, since the image capturing LSI configured to capture an image, the image linear conversion/timing control LSI configured to carry out image linear conversion and the parallax computing LSI configured to carry out parallax computation are separately provided in the configuration of FIG. 8, the general purpose parallax computing LSI may be flexibly used or the number of camera images supplied may be flexibly increased. Note that these LSIs may be combined into one LSI such as SOC or SIP based on cost requirement and size.

Figure 15:
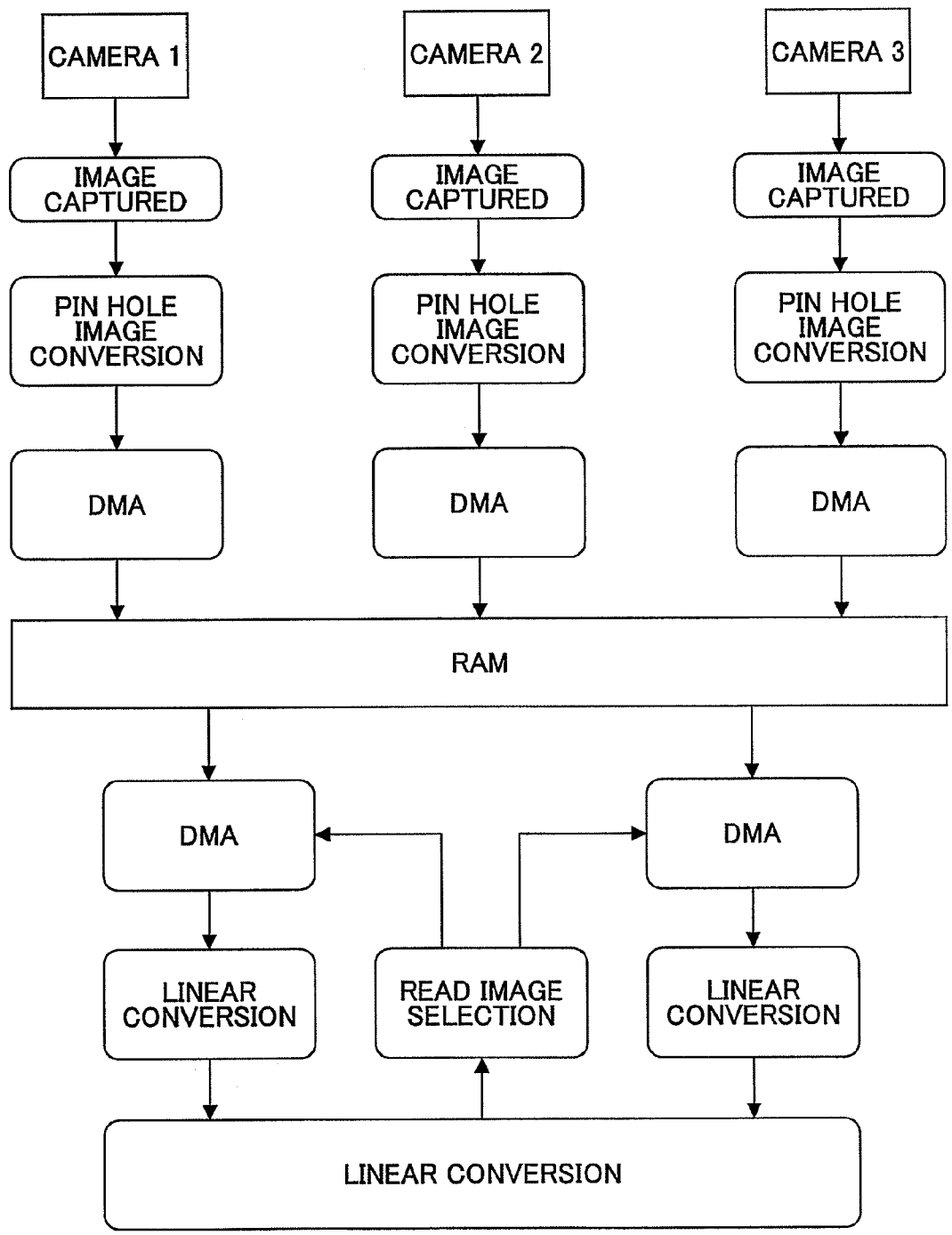
FIG. 15 is a flowchart illustrating operations for processing the camera images.

FIG. 15 illustrates a process flow if the image pickup apparatus having a configuration of FIG. 14 has three cameras. The image-pinhole image conversion processes in the respective cameras are carried out in parallel; the processed images are sequentially DMA-transferred to RAM. The two camera image pairs specified by a not-shown read image transfer section are read (retrieved) from the RAM for stereo computation.

Linear conversion as illustrated in FIGS. 11 to 13 is carried out on the read images to generate the images having predetermined camera design values, thereby carrying out parallax computation. In this process, the images to be read will eventually be a pair of (two) stereo camera images. In this process, the easiest method may be to allow all the stereo camera pairs images to be processed in the same shared time (different pieces of parallax computation are carried in the equally divided time). For example, three stereo cameras for measuring a distance are prepared. The stereo camera 1 is prepared for measuring a short distance, the stereo camera 2 is prepared for measuring an intermediate distance, and the stereo camera 3 is prepared for a long distance from an observer to a target (object or person). In this process, if the parallax computation is simultaneously carried out on the images captured by the stereo cameras 1, 2, and 3 in the shared time (equally divided time), the processes are carried out in the shared time as illustrated in FIG. 16A. As illustrated in FIG. 16A, short-distance measuring computation by the stereo camera 1, intermediate-distance computation by the stereo camera 2, and long-distance computation by the stereo camera 3 are equally carried out in the shared time. However, since, in general, an urgent case often requires measuring a short distance, distance computation for measuring the short distance may need to be more frequently carried out than distance computation for measuring other distances in the shared time as illustrated in FIG. 16B. As illustrated in FIG. 16B, short-distance measuring computation carried out by the stereo camera 1 is more frequently carried out than intermediate-distance measuring computation and long-distance measuring computation carried out by the stereo cameras 2 and 3 in the same shared time.

Figure 17:
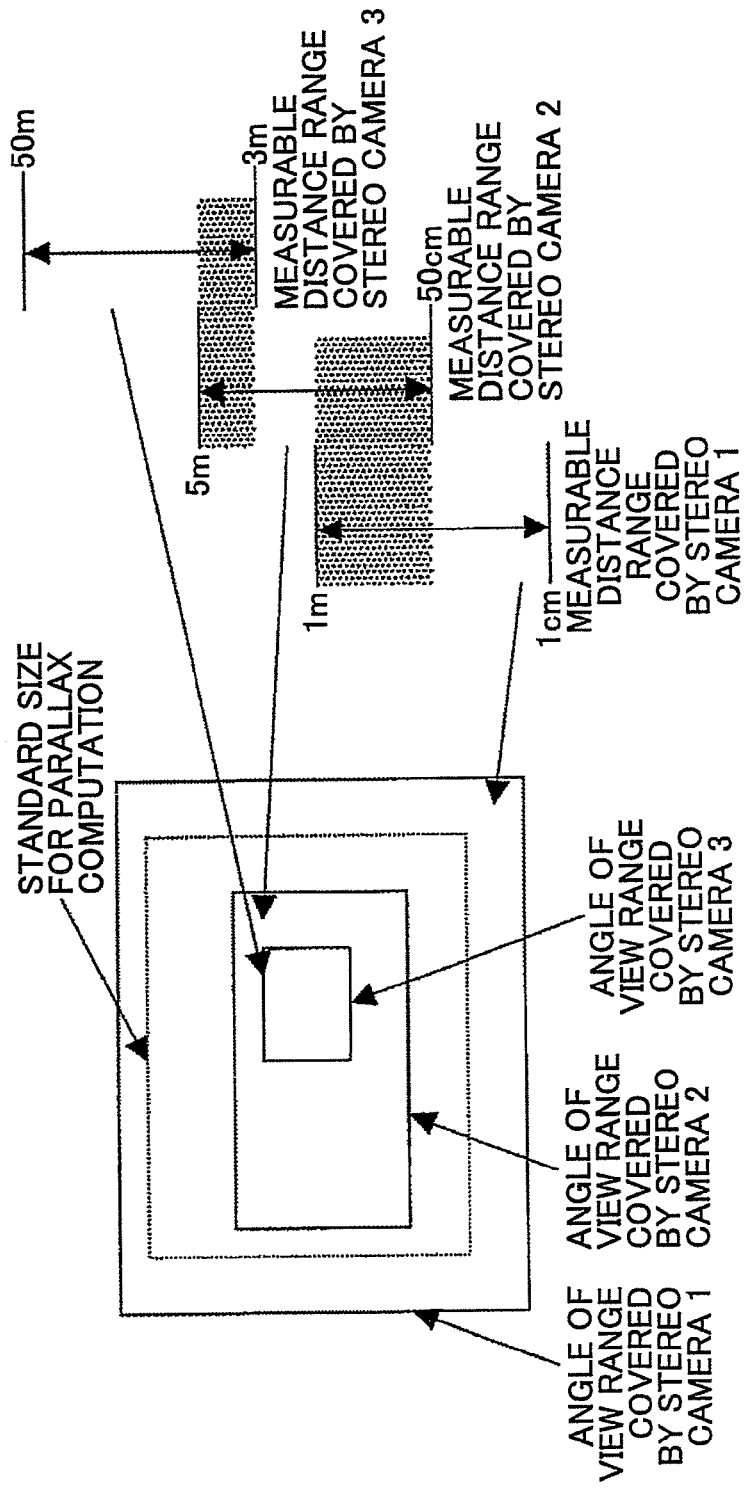
FIG. 17 is a diagram illustrating a relationship between measurable distance ranges of different stereo cameras and corresponding angles of view.
Figure 18:
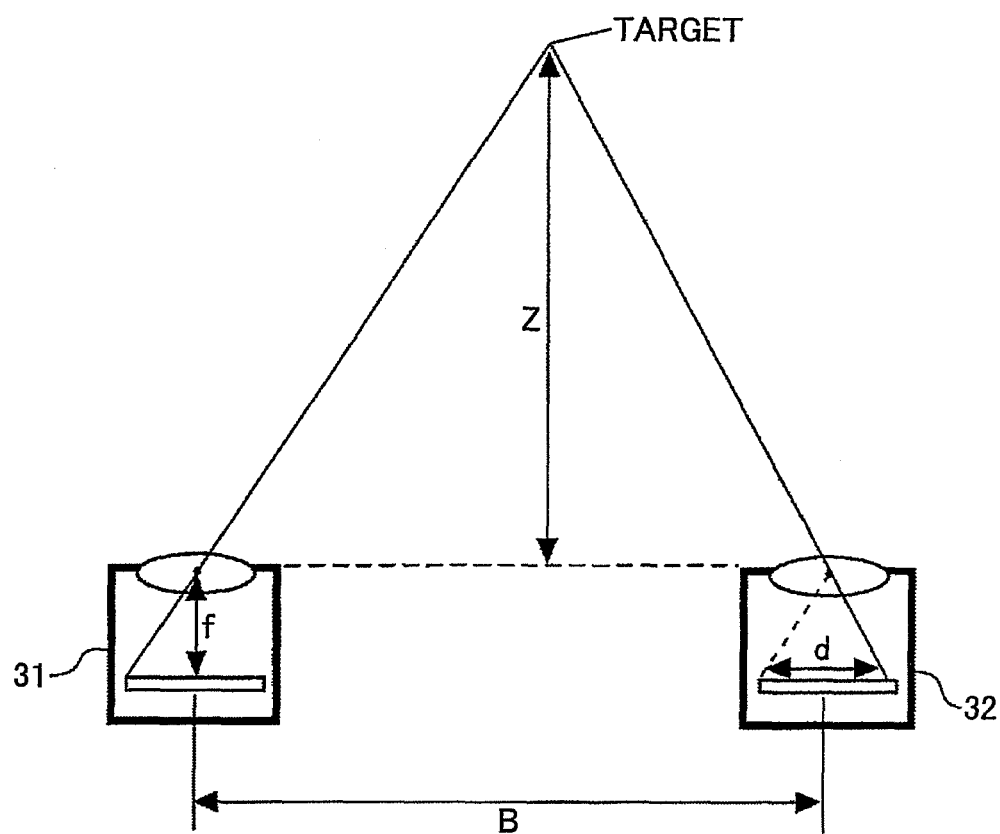
FIG. 18 is a diagram illustrating a principle of a stereo camera.
Figure 19A:
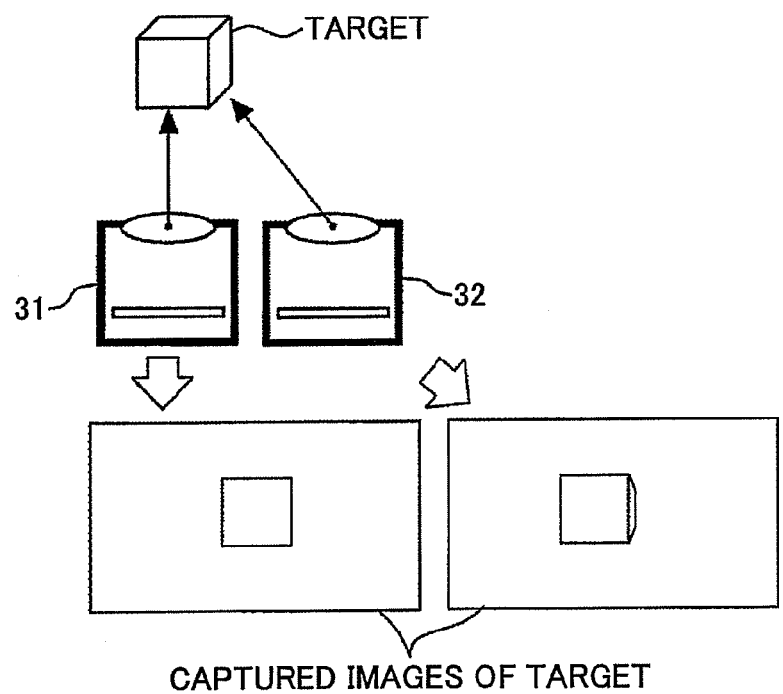
FIGS. 19A and 19B are diagrams illustrating a difference in views acquired from different positions of the stereo cameras.
Figure 19B:
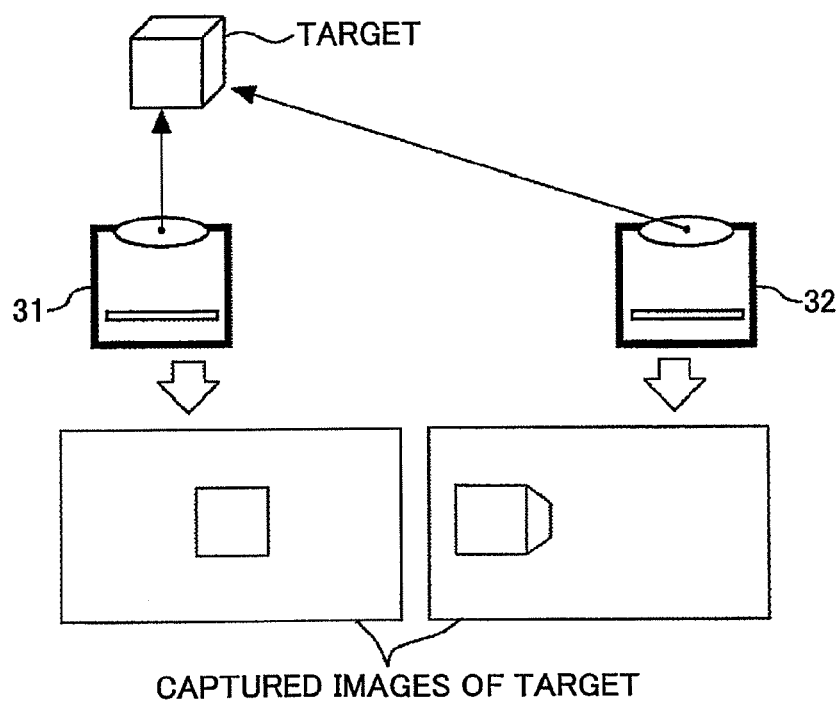

Note that as illustrated in FIG. 2, although the different stereo cameras have different measurable distance ranges and angles of view, there are overlapped portions between the distance ranges as illustrated in FIG. 17. As illustrated in FIG. 17, if there are three stereo camera sets providing three baseline lengths, overlapped measurable distance ranges are illustrated as hatched portions on the right hand side of FIG. 17. In general, the longer is the distance obtained from the observer to the target, the smaller the angle of view becomes. The corresponding angle ranges of views of the stereo cameras 1, 2, and 3 before linear conversion are illustrated on the left hand side of FIG. 17. In the following, how the overlapped measurable ranges are treated in the distance measurement is examined. For example, the distance measurement may be determined based on the following points.

(1) Which stereo camera is to measure the overlapped portion is determined in advance. This method is effective for simplifying a computational process and reducing computational load.

(2) The earliest computed distance is selected as a measured distance. This method is effective when the distance is to be computed as quickly as possible.

(3) All the distances are computed and an appropriate one is selected based on the weight or reliability level associated with the distance results. This method is effective when selecting a more reliable one of the computed distance results by associating weights or reliability levels with the computed distance results.

(4) The mean of the computed distance results is used as the measured distance. This method is effective in eliminating noise components and providing stabilized use because the distances of the overlapped portions are averaged and determined as the measured distance each time when the stereo camera image pair is output.

(5) The computed distance result obtained by the stereo camera having higher resolution in the image before linear conversion is selected as the measured distance. This method is effective because the stereo camera having high resolution indicates a superior physical configuration capable of exhibiting high reliability in theory.

Further, while carrying out the distance measurement based on the above points using an on-vehicle forward side monitoring camera, the distance measurement computed based on the distance range that is set as the extremely dangerous region may preferably be selected if a target residing in the extremely dangerous region is detected by the stereo cameras.

For example, in the above case (1) where the stereo camera 2 is to measure in a distance range of 1 m or more, and the stereo camera 2 suddenly captures the target in the distance of several tens centimeters at the end of the image area, the distance of several tens centimeters is prioritized. This is because a cut-in vehicle or a traverser may have suddenly appeared in front of the vehicle (i.e., the observer). The configuration illustrated in FIG. 7 where the cameras are arranged in different directions may also be applied to this embodiment.

In one embodiment, there is provided an image pickup apparatus for use in measuring a distance from an observer to a target. The image pickup apparatus includes a case; and a plurality of cameras configured to capture images of the target is fixed in the case, where the distance from the observer to the target is measured based on the images of the target captured by altering baseline lengths for parallax computation obtained by combining any two of the cameras.

In the image pickup apparatus of the above embodiment, each of the two cameras is a first compound-eye camera that includes a lens array having a plurality of lenses arranged in a plane and a sensor, and the baseline lengths for parallax computation include a baseline length obtained by combining the plural lenses in the first compound-eye camera.

In the image pickup apparatus of the above embodiment, the plural cameras further include one of a second compound-eye camera and a noncompound camera that has a lens shape differing from a lens shape of the first compound-eye camera. Note that the second compound-eye camera or the noncompound camera having the lens shape differing from the lens shape of the first compound-eye camera indicates that the second compound-eye camera or the noncompound camera includes lens designing data differing from those of the first compound-eye camera. The lens designing data include the number of lenses, a focus distance and an angle of view in a camera.

In the image pickup apparatus of the above embodiment, the sensor provided in the first compound-eye camera is formed by arranging plural sensors on a substrate.

In the image pickup apparatus of the above embodiment, the plural cameras include respective lenses and sensors to have different angles of view and focus distances.

In the image pickup apparatus of the above embodiment, at least one of the cameras is a compound-eye camera that includes a lens array having a plurality of lenses arranged in a plane and a sensor, and the baseline lengths for parallax computation include a baseline length obtained by combining the plural lenses in the compound-eye camera.

The image pickup apparatus of the above embodiment further includes a pinhole image output unit configured to convert the images captured by the cameras having the respective lenses and the respective sensors into idealized pinhole images to output the idealized pinhole images.

The image pickup apparatus of the above embodiment further includes a logic unit configured to carry out enlargement or reduction processing on the images captured by the cameras having the respective lenses and the respective sensors to form the images having a uniform size.

In the image pickup apparatus of the above embodiment, the distance from the observer to the target based on any one of the baseline lengths for parallax computation obtained by the combination of the cameras is computed utilizing an algorithm.

In the image pickup apparatus of the above embodiment, the baseline lengths for parallax computation are sequentially computed and the distance from the observer to the target is determined when a desired one of distance ranges is obtained based on a corresponding one of the computed baseline lengths.

The image pickup apparatus of the above embodiment further includes a storage unit configured to store distances from the observer to the target computed based on the baseline lengths for parallax computation, such that a desired one of the stored distances from the observer to the target is selected from the storage unit in a process subsequent to a storing process where the distances computed based on the baseline lengths are stored in the storage unit.

The image pickup apparatus of the above embodiment further includes a storage unit configured to store distances from the observer to the target computed based on the baseline lengths for parallax computation, such that a desired distance from the observer to the target is computed by averaging the stored distances from the observer to the target computed based on the baseline lengths for parallax computation stored in the storage unit.

In the image pickup apparatus of the above embodiment, the desired one of the stored distances selected from the storage unit is a distance computed based on a longest baseline length for parallax computation.

In the image pickup apparatus of the above embodiment, the distance from the observer to the target that is urgently measured is obtained by increasing a number of distance computations.

In the image pickup apparatus of the above embodiment, at least one of the plural cameras is arranged in a camera setting direction differing from camera setting directions of the other cameras.

The image pickup apparatus of the above embodiment further includes an image separation-integration circuit configured to separate the images or integrate the images; and a parallax process circuit configured to carry out parallax computation, wherein parallax computation carried out on the images acquired by the cameras is performed by the image separation-integration circuit and the parallax process circuit.

In another embodiment, there is provided a rangefinder that includes an image pickup apparatus.

According to the above embodiments, the image pickup apparatus (stereo camera) includes a case and plural compound-eye cameras arranged with predetermined intervals in the case. Each compound-eye camera has one sensor and a lens array having plural lenses arranged in a plane that is capable of measuring a distance range of mm units. With this configuration, the stereo camera is capable of measuring a distance range of m units. That is, with this configuration, the image pickup apparatus is capable of measuring the ultra-short distance range to the long distance range. Further, with this configuration, manufacturing cost may be reduced by decreasing the number of sensors in the image pickup apparatus to realize the image pickup apparatus as one camera unit having a rangefinder function. That is, with this configuration, the image pickup apparatus capable of measuring the ultra-short distance range of mm units to the long distance range exceeding 100 m with high accuracy may be produced at low cost and the rangefinder having such an image pickup apparatus may be realized.

According to the above embodiments, three or more cameras including lenses and sensors are provided in a case. Plural baseline lengths may be covered (formed) by flexibly combining (pairing) any two of the three cameras, thereby increasing measurable distance ranges with high accuracy. Further, the above three or more cameras are provided together with the compound-eye camera including one sensor and a lens array having plural lenses arranged in a plane that is capable of measuring the ultra-short distance range of several mm in the same case. Accordingly, one camera unit is capable of measuring the ultra-short distance range through the long distance range. The above cameras may not have a uniform angle of view or a uniform focus distance. With this configuration, the images of the same target (object) captured by the different cameras have different sizes; however, the different sizes of the images of the same target are converted into a uniform size by enlarging or reducing methods. Accordingly, any combination of the cameras in the camera unit may carry out the simple distance measurement computation. Further, the combination of the cameras may carry out distance measurement utilizing one distance measuring algorithm while switching time, thereby realizing cost reduction.

Further, the present invention is not limited to these embodiments, but various variations and modifications may be made without departing from the scope of the present invention.

The present application is based on Japanese Priority Application No. 2010-044168 filed on Mar. 1, 2010, and Japanese Priority Application No. 2010-277395 filed on Dec. 13, 2010, with the Japanese Patent Office, the entire contents of which are hereby incorporated by reference.

What is claimed is:

1. An image pickup apparatus for use in measuring a distance from an observer to a target, the image pickup apparatus comprising:
a case; and
a plurality of cameras configured to capture images of the target, the cameras being fixed in the case,
wherein the distance from the observer to the target is measured by performing parallax computation on the captured images of the target, and wherein the image pickup apparatus is configured to alter baseline lengths for the parallax computation by combining any two of the cameras, and
wherein the baseline lengths for the parallax computation are sequentially computed and the distance from the observer to the target is determined when a distance range is obtained based on a corresponding one of the computed baseline lengths, and wherein parallax computations for a first one of the baseline lengths is carried out at a first frequency, and parallax computations for a second one of the baseline lengths is carried out at a second frequency, and the first one of the baseline lengths is shorter than the second one of the baseline lengths, and the first frequency is greater than the second frequency, such that the image pickup apparatus is configured to measure a first distance from the observer more frequently than a second distance from the observer, the first distance being shorter than the second distance.

2. The image pickup apparatus as claimed in claim 1, wherein the two cameras that are combined are first compound-eye cameras, and wherein each of the first compound-eye cameras includes a lens array having a plurality of lenses arranged in a plane and a sensor, and the baseline lengths for the parallax computation include a baseline length obtained by combining the plurality of lenses in the first compound-eye cameras.

3. The image pickup apparatus as claimed in claim 2, wherein the plurality of cameras further include one of a second compound-eye camera and a noncompound camera that has a lens shape differing from a lens shape of the first compound-eye cameras.

4. The image pickup apparatus as claimed in claim 2, wherein the sensor provided in the first compound-eye camera is formed by arranging plural sensors arranged on a substrate.

5. The image pickup apparatus as claimed in claim 1, wherein the plurality of cameras include respective lenses and sensors to have different angles of view and different focus distances.

6. The image pickup apparatus as claimed in claim 5, wherein at least one of the cameras is a compound-eye camera that includes a lens array having a plurality of the lenses arranged in a plane and the sensor, and the baseline lengths for the parallax computation include a baseline length obtained by combining the plurality of lenses in the compound-eye camera.

7. The image pickup apparatus as claimed in claim 5, further comprising: a pinhole image output unit configured to convert the images captured by the cameras having the respective lenses and the respective sensors into idealized pinhole images to output the idealized pinhole images.

8. The image pickup apparatus as claimed in claim 5, further comprising: a logic unit configured to carry out enlargement or reduction processing on the images captured by the cameras having the respective lenses and the respective sensors to form the images having a uniform size.

9. The image pickup apparatus as claimed in claim 5, wherein the distance from the observer to the target based on any one of the baseline lengths for the parallax computation obtained by the combination of the cameras is computed utilizing an algorithm.

10. The image pickup apparatus as claimed in claim 5, further comprising: a storage unit configured to store a plurality of the distances from the observer to the target computed based on the baseline lengths for the parallax computation, such that a stored distance from the observer to the target is selected from the storage unit in a process subsequent to a storing process where the distances computed based on the baseline lengths are stored in the storage unit.

11. The image pickup apparatus as claimed in claim 10, wherein the stored distance selected from the storage unit is a distance computed based on a longest baseline length for the parallax computation.

12. The image pickup apparatus as claimed in claim 5, further comprising: a storage unit configured to store a plurality of the distances from the observer to the target computed based on the baseline lengths for the parallax computation, such that a distance from the observer to the target is computed by averaging the stored distances from the observer to the target computed based on the baseline lengths for the parallax computation stored in the storage unit.

13. The image pickup apparatus as claimed in claim 1, wherein at least one of the plurality of cameras is arranged in a camera setting direction differing from camera setting directions of the other cameras.

14. The image pickup apparatus as claimed in claim 1, further comprising: an image separation-integration circuit configured to separate the images or integrate the images; and a parallax process circuit configured to carry out the parallax computation, wherein the parallax computation carried out on the images acquired by the cameras is performed by the image separation-integration circuit and the parallax process circuit.

15. A rangefinder comprising the image pickup apparatus as claimed in claim 1.

* * * * *